United States Patent [19]

Wolbrink et al.

[11] 4,102,448

[45] Jul. 25, 1978

[54] CONVEYING APPARATUS INCLUDING TILTING SUPPORT STRUCTURES

[75] Inventors: David W. Wolbrink; Richard L. Speaker, both of Hartford, Wis.

[73] Assignee: S I Handling Systems, Inc., Easton, Pa.

[21] Appl. No.: 765,708

[22] Filed: Feb. 4, 1977

Related U.S. Application Data

[63] Continuation of Ser. No. 242,330, Apr. 10, 1972, abandoned.

[51] Int. Cl.$^2$ ............................................. B65G 43/00
[52] U.S. Cl. ...................................... 198/365; 104/88; 105/241 C; 198/370; 198/796; 214/11 R
[58] Field of Search ...................... 214/62, 62 A, 11 R; 105/241, 241 C, 263, 274, 278, 257, 261, 261 A, 268; 298/18; 294/64 R; 198/365, 370, 796; 104/88

[56] References Cited

U.S. PATENT DOCUMENTS

| | | | |
|---|---|---|---|
| 416,393 | 12/1889 | Bogusch | 105/263 |
| 840,618 | 1/1907 | Golombek | 248/206 |
| 1,066,527 | 7/1913 | Rakowsky | 105/270 |
| 2,877,889 | 3/1959 | Rittberger | 198/822 |
| 3,024,924 | 3/1962 | Lingard | 214/63 |
| 3,187,684 | 6/1965 | Ortner | 105/248 |
| 3,265,010 | 8/1966 | Makiri | 198/324 |
| 3,360,106 | 12/1967 | Harrison et al. | 198/365 |

Primary Examiner—Evon C. Blunk
Assistant Examiner—Douglas D. Watts
Attorney, Agent, or Firm—Seidel, Gonda & Goldhammer

[57] ABSTRACT

A conveyor tray is longitudinally tilted downwardly in the direction of the movement with a front stop wall having a center notch to support the back of a load applied to the preceding tray. Each tray is also split or divided longitudinally into two tray members, each extending upwardly from the pivot point to an outer portion projecting outwardly at a significantly more shallow angle to the horizontal. A continuous surface cover in which the central portion overlying the pivot line is readily flexible. The pivot axis may be located vertically on a line between the tray members to provide a specific radius in the flexible cover. Each tray half is held by a latch mechanism including a plate with a latch notch within which a latching roller carried by a lever is disposed. The plate has a curved guide edge which engages the roller to produce a guide movement to a release position. A suction cup type bumper is secured to the carriage and engaged by a tilted tray member which is provided with a metering hole to release the bumper after absorbing the shock.

26 Claims, 9 Drawing Figures

CONVEYING APPARATUS INCLUDING TILTING SUPPORT STRUCTURES

This application is a continuation of application Ser. No. 242,330 filed Apr. 10, 1972 for Conveying Apparatus Including Tilting Support Structures, now abandoned.

BACKGROUND OF THE INVENTION

This invention relates to a tilting support type conveying system and particularly to such system for selectively distributing of individual loads between a loading means and a receiving means, by selective actuation of a plurality of sequentially moving interconnected load carrying and support structures.

The development of modern mechandising systems has required development of various conveying apparatus to accommodate the rapid retrieval and distribution of a plurality of different load items with conveyance to one or more receiving stations.

In particular distributing and sorting conveying devices have been devised for receiving a plurality of elements and distributing them to a plurality of different unloading or receiving stations in accordance with a predetermined plan. Tilting tray structures have been developed including a plurality of tray carriers interconnected to a common chained drive for movement in a generally horizontal plane between one or more loading stations and a plurality of unloading stations. Each of the trays is mounted for tilting to opposite sides for the selective discharge of the load thereon. A memory input unit at the loading station provides for automatic actuation of an unloading device and a particular unloading station for tilting such conveyor at such selected unloading station. Typical conveying systems of the above type are shown in the Speaker et al U.S. Pat. No. 3,510,014, Bishop et al U.S. Pat. No. 3,269,520 and the Imsberger U.S. Pat. No. 3,150,763. In the Speaker and Bishop patents individual tray structures are centrally, pivotally mounted to a carriage which, in turn, is interconnected to a chain drive. The several tray structures are mounted and latched in a horizontal transporting position. At an unloading station a latch release and tilting mechanism is provided which moves into the path of a selected tray assembly and provides automatic releasing of the latching structure and positive tilting of the interconnected tray structure. The Imsberger U.S. Pat. No. 3,150,763 discloses a somewhat different tray tilting construction wherein the tray structures at the several unloading stations are formed into a pair of half members which are separated. A pusher system extends upwardly between the trays for pushing of the load along the horizontal surface defined by the various horizontally disposed tray structures. The tray structures are interconnected by a suitable pivot support which extends downwardly beneath the pusher mechanism to define a single interconnected supporting surface. When a load is to be discharged the tray structure, as a unit, is tilted to either side to correspondingly provide for gravity discharge of the related load.

A split V-shaped tray design has also been suggested wherein the support tray is split longitudinal with each half separately pivoted to a discharge position. Each member is individually pivoted and includes a latch means selectively holding the members in a transport position and releasing of one-half of the load support for discharging of the load. The split tray halves in a transport position extend upwardly from the horizontal to define a generally shallow V-shaped supporting member. The individual tray halves are pivotally dropped to a discharge position with the released split tray half projecting downwardly as a planar extension of the opposite half which is maintained in the transport position.

Although the horizontal tray supporting devices of the prior art with the double tilt to the respective sides have provided a satisfactory discharge system for distributing conveyors or the like, there has been a continuous demand to increase the speed of operation and the reliability of the discharge of the load from the support at a particular unloading station.

SUMMARY OF PRESENT INVENTION

The present invention is particularly directed to a conveying system for selective unloading of a load employing a plurality of sequentially moved split support structures.

In accordance with one aspect of the present invention, the tray assembly is longitudinally tilted in the direction of the movement with the leading end extended downwardly below the trailing end. A forward stop means acts to locate the load. This results in an improved forward and lateral movement of the package as it is discharged. The upper surface of the stop plate is preferably, especially formed with a notched construction to provide and accommodate the trailing end of a load applied to the forward support assembly.

Each of the split load supporting structures may be covered with a continuous surface cover in which the central portion overlying the pivot line is readily flexible to permit the independent pivotal movement of each half of the load supporting structure, such as a plastic cover having a central portion formed to permit ready flexing at the pivot point.

The pivot support means may be located upwardly of the pivot point which would be defined by the projection of the tray units to a common apex. This provides a very distinct radius in the flexible cover portion and contributes to convenient pivoting of each half of the tray structures to a discharge position, preferably into planar alignment with the opposite half of the structure. The precise location of the pivot point may of course be varied along a vertical plane between the trays to achieve a particular desired tilt action.

In accordance with a preferred and particularly novel aspect of the present invention, the interrelated split units may be formed with a lateral double inclined construction to define a relatively sharp angular receptacle extending upwardly from the pivot point and with the outer half or portion projecting outwardly at a significantly more shallow angle to the horizontal.

In accordance with a particular further aspect of the present invention, each of the tray halves is separately latched in the load supporting position. Each of the latch mechanisms includes a guide plate member interconnected to the underside of the corresponding tray half with the lower end of the latch plate extending generally beneath the pivot axis for the tray assembly and interconnected to the carriage by a notch and pin coupling means. The plate preferably includes a latch notch and pin coupling means. The plate preferably includes a latch notch within which a latching roller is disposed. The roller is connected to a lever which is adapted to be automatically moved from the notch and thereby release the plate and attached tray. The plate may be formed with a guide edge which engages the latching roller. Applicants have found that the essentially unrestricted gravity release in combination with the front wall stop provides accurate definition of the forward and lateral trajectory of the load with a very reliable and improved discharge movement.

In order to prevent bouncing or recoil of the tray as a result of the rapid downward movement when released, it is preferably provided with a special bumper means in the form of one or more suction cup type bumpers engaged by a tilted tray. In order to provide a highly improved and controlled construction, a metering hole is provided for a bumper assembly. During the rapid movement to the discharge position a relatively firm interengagement is effected between the bumper cup and the tray structure to prevent recoil. However, the metered hole is such that after the initial shock forces, the suction force is significantly reduced to permit ready resetting of the tray unit.

The split tray arrangement can of course be interconnected as a part of a conventional horizontal platform transfer or conveying system, a carousel type unit or an overhead trolley system wherein the individual tray units are carried in a suitable hanger structure.

The present invention thus provides a highly improved conveying mechanism for sorting, distributing and the like, and permits high speed reliable transfer between one or more loading stations and one or more unloading stations.

BRIEF DESCRIPTION OF THE DRAWINGS

The drawings furnished herewith illustrate preferred constructions of the present invention in which the above advantages and features are clearly disclosed as well as others which will be readily understood from the following description, of the illustrated embodiment.

In the drawings.

DESCRIPTION OF THE ILLUSTRATED EMBODIMENT

Figure 1:
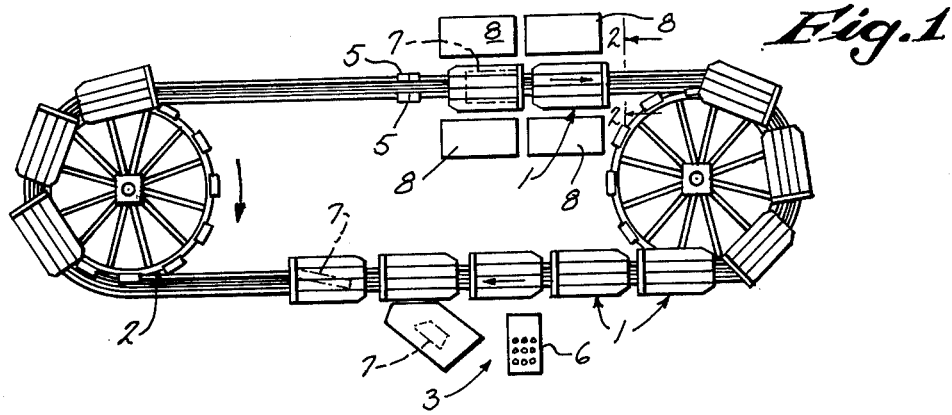
FIG. 1 is a diagrammatic top view of a conveying system constructed in accordance with the teaching of the present invention.
Figure 2:
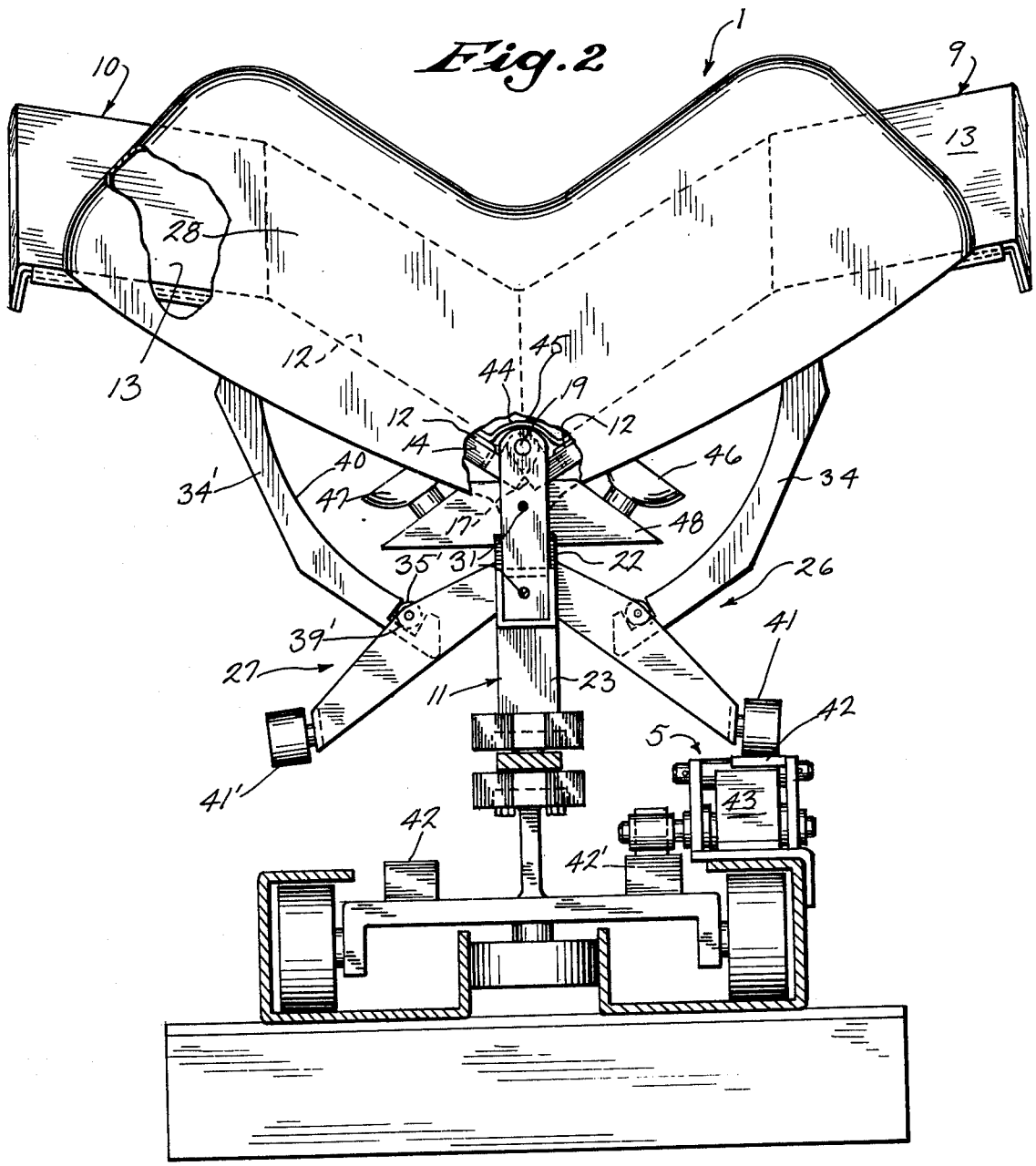
FIG. 2 is an enlarged front view taken between a pair of the tray units and generally on a line 2—2 of FIG. 1.
Figure 3:
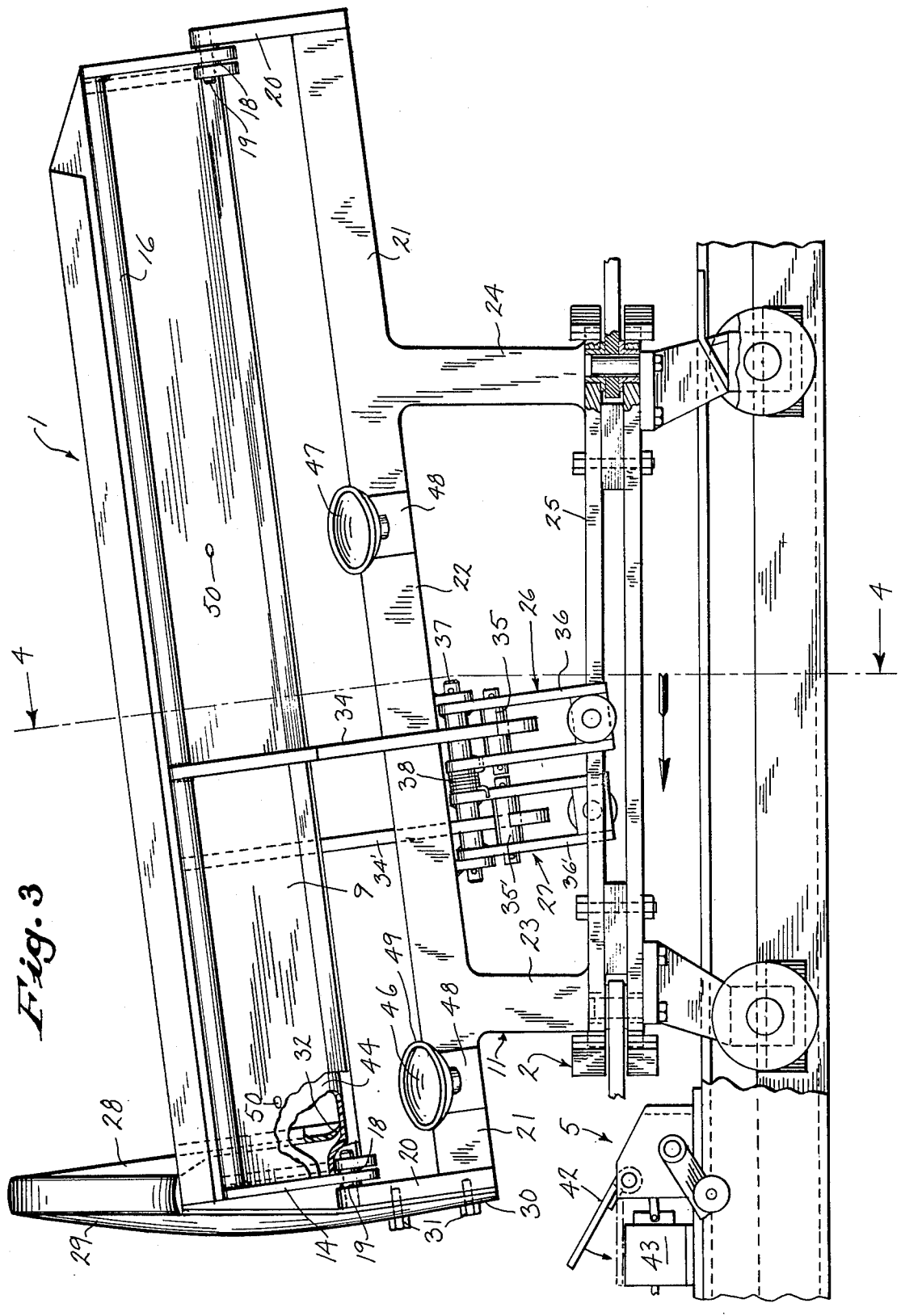
FIG. 3 is an enlarged side elevational view of a tray assembly shown in FIGS. 1 and 2.

Referring to the drawings and particularly to FIGS. 1-3, the present invention includes a plurality of tray or load support assemblies 1 interconnected to an articulated chain drive 2. In the illustrated embodiment of the invention the tray assemblies 1 are disposed to move in a horizontal plane as a continuous closed loop for transfer between a loading station 3 and a plurality of unloading stations 4, which may be provided to the opposite sides of the conveying path. At each of the unloading stations, discharge actuating assemblies 5 are provided to the opposite sides of the path for selected coupling to an aligned tray unit 1 and when actuated tilts a tray unit 1 to a discharge position. Each of the discharge actuating assemblies 5 is selectively controlled from a selection control unit 6 provided at the loading stations 3. Thus, the control unit 6 will normally provide for a manual or automatic input in accordance with a predetermined unloading station identification which is inserted into a memory unit which retains the control signal until the loaded tray unit 1 is in predetermined alignment with the selected unloading station 4, at which time the discharge assembly 5 is automatically actuated to tilt the tray unit 1 for discharging of a load 7 to the receiving means 8. Thus the illustrated application of this invention is generally of a horizontal loop sorter such as shown in the previously referred to patents. The present invention is particularly directed to the novel tray unit 1 and the interconnection of a supporting means such as a carriage coupled to the chain 2. The interconnection of the individual units to the drive, the construction of the loading and unloading means as well as the memory control unit may take any desired form or construction and, consequently, no further description is given other than as required to clearly describe the preferred construction of the present invention.

Referring particularly to FIGS. 2 and 3, each of the tray assemblies 1 includes a pair of split tray halves or members 9 and 10 which are separately and individually pivotally mounted to a carriage unit 11 which is interconnected to the drive chain 2. A wheel and track assembly 11a is secured to the chain 2 and support the unit 1 for movement about the loop. Each of the split tray members 9 and 10 are similarly formed and pivotally interconnected for individual pivotal movement and thus the tray member 9 is particularly defined with the corresponding elements of the tray member 10 identified by corresponding primed numbers.

The tray member 9 is shown formed of a suitable platelike material such as a sixteen gauge metal. The tray member is formed with dual inclined planar support surfaces including a first sharp incline or slope portion 12 which in the transport position extends upwardly from the central portion of the tray assembly to the second portion 13. The second portion 13 has a significant lesser slope with respect to the horizontal and projects outwardly therefrom. In the illustrated embodiment of the invention, the tray portions 12 and 13 each approximately correspond to one-half of the total lateral width of the tray surface. The dual inclined surfaces define a pair of angled supports for carrying of different shaped loads in a reliable manner in a high speed conveying apparatus.

The tray member 9 is supported by a pair of hinge leafs 14 secured to the forward and trailing edges of the tray member 9. In particular, each of the hinge leafs 14 is generally an L-shaped arm with a relatively long portion extending immediately beneath the slope portion 12 and secured to the underside of the tray member 9 as by a weld 15. A cross bracket or brace tube 16 extends beneath the tray and is suitably secured to the outer end of the leafs 14 such as by suitable welding. The opposite arm 17 of the leaf 14 extends upwardly of the tray member 9 terminating slightly above the lowermost edge of the tray assembly. As most clearly shown in FIG. 4, the leaf arm 17 is apertured and includes a pivot bushing 18 which is press-fitted or otherwise suitably secured within the corresponding arm. A pivot pin 19 is carried by a vertical arm on the carriage and is located to receive the bushing 18 and provide a pivotal support for the corresponding tray member 9. The tray member 10 is similarly pivotally mounted upon the pins 19. To provide for the common mounting, the one leaf 14 is secured to the corresponding tray member 9 or 10 spaced slightly inwardly from the edge and thus located on the pin 19 axially of the opposed leaf 14. To permit interchangeable mounting, each tray member has one leaf on the edge and the opposite leaf similarly spaced inwardly of the edge.

The pivot pin 19 is welded or otherwise fixedly secured in a hinge support plate 20 connected to and forming a part of the carriage 11.

The carriage 11 is a generally rectangular frame which extends beneath the tray structure with the hinge projections 21 on the opposite ends of the top bar 22 to define a corresponding pivot pin support arrangement for the opposite leaf 14 at the opposite end of the tray assembly. This illustrated carriage is shown as a cast member having the top bar 22 supported by a leading post 23 and a trailing post 24 upon a bottom bar 25. The chain drive 2 is connected to the bottom bar 25 for moving of the associated tray assembly 1 in the endless transport path. The trailing post 24 is slightly longer than post 23 to locate the top bar 22 angularly oriented in a vertical plane with the leading end substantially below the trailing end. Although the particular drive and support for the individual members can take any variety or may be of any suitable construction, the illustrated invention particularly shows the support interconnected to and integrated with a drive chain 2 which is more fully described in the teaching of the co-pending application entitled "LINK AND SPROCKET DRIVE APPARATUS", which was filed on the same date as this application and is assigned to a common assignee of the present application.

The tray members 9 and 10 are similarly supported in a transport position by a separate latch assembly 26 and 27, as shown most clearly in FIGS. 2 and 3.

The individual tray assemblies 4 are thus inclined longitudinally of the direction of movement with the leading end lower than the trailing end such that the load 7 tends to slide forwardly. The forward end of each tray assembly is closed and an individual front wall 28 is interconnected to the understructure or carriage 11 to provide a fixed front wall which prevents movement of the load 7 forwardly of the inclined support.

The illustrated front wall 28 is integrally formed with a support plate 29 having a depending arm 30 aligned with and secured to forward pivot post 20, by mounting bolts 31. The wall 28 is preferably formed of a suitable plastic with the lower edge overlying the leading portion of the tray supporting surface. The lower wall edge is molded with a lower feathered lip 32 which engages, and is deflected upwardly by the support surface of the tray members 9 and 10 in the transport position. The lip 32 thus provides a slight resilient load on the tray members to minimize noise. The upper edge of the front wall is notched as at 33 to define a generally V-shaped support for the trailing end of an exceptionally long load; that is, one which cannot be carried within the longitudinal confines of a single tray assembly. Depending upon the particular load configuration, both or only the leading tray unit may be tripped to the discharge position by operation of the appropriate actuating means 5 depending upon whether the load will smoothly move from the trailing unit 1 without being tripped.

Figure 4:
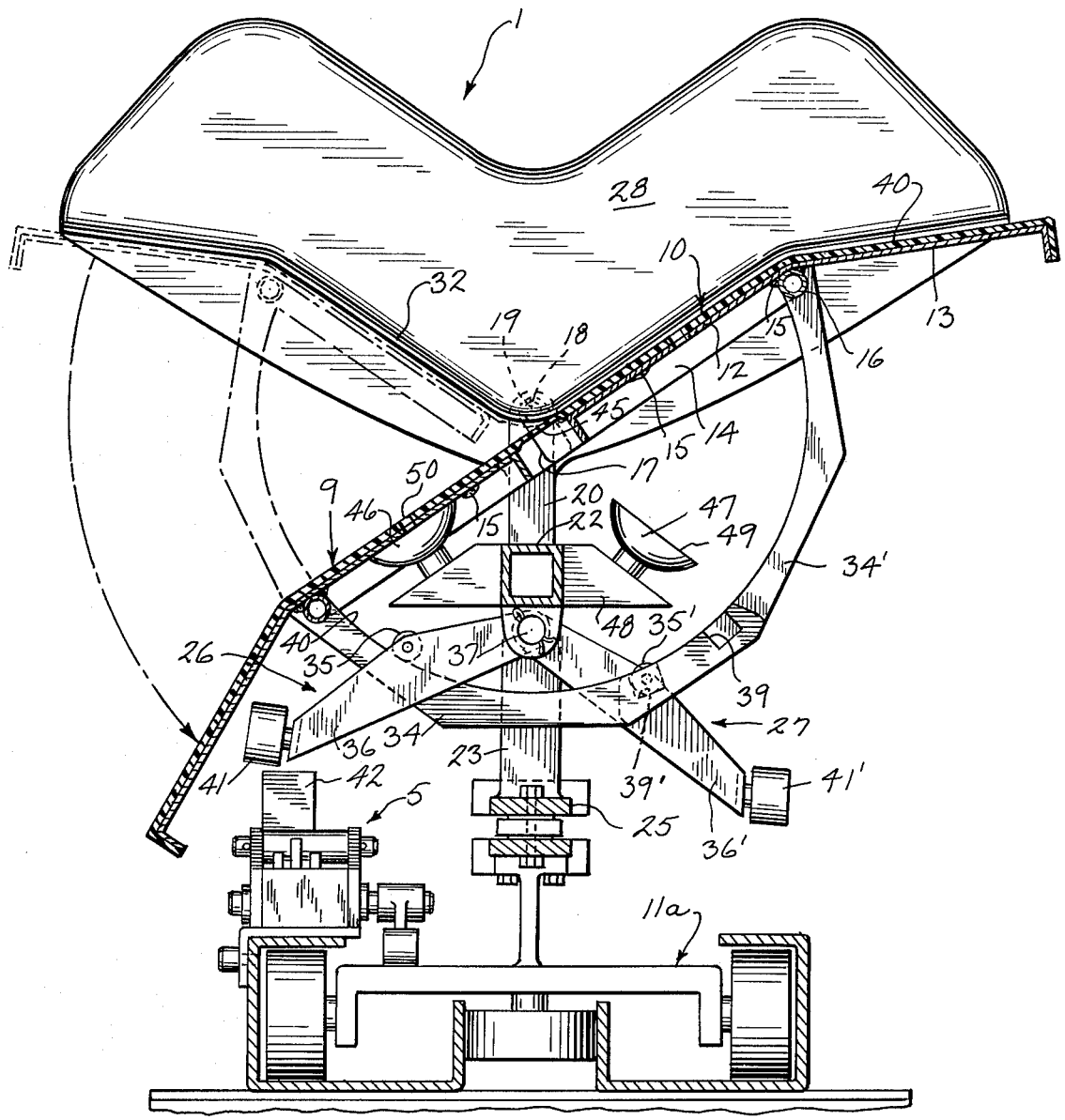
FIG. 4 is a vertical section taken generally on line 4—4 of FIG. 3 and more clearly illustrating the tripping mechanism shown in FIGS. 2 and 3.

The latch means 26 and 27 provide for the individual pivotal support of each of the tray members 9 and 10 of each tray assembly 1. In particular, the latch means 26 for tray member 9 includes a latch arm or plate 34 which is generally a quadrature curved arm having the upper end rigidly secured to the tray member 9 as by welding to the cross brace 16. The arm 34 curves downwardly and inwardly beneath the level of top bar 22 of carriage 11 and particularly beneath a roller latch pin 35 which is pivotally mounted to carriage 11. The latch pin 35 is journaled in a latch lever 36 in the form of a pair of parallel plate arms defining a bifurcated lever through which arm 34 passes. The lever 36 is journaled on a pivot shaft 37 secured to the underside of the top bar 22. A coil spring 38 encircles the shaft and resiliently urges the lever and pin 35 toward the inner edge of the arm 34. A notch 39 is provided in the inner edge of the corresponding latch arm 34. In the transport position, the pins 35 and 35' are located in the corresponding notches 39 and 39' and hold the tray members 9 and 10 raised and in the load-carrying position. When a pin 35 or 35' is pivoted outwardly from the corresponding notch, the corresponding arm and attached tray member is free to drop under the force of gravity created by the tray member and any load thereon which is applied on the tray member in the illustrated embodiment of the invention. The tilted position for member 9 is shown in FIG. 4.

The inner edge of the latch plate 34 in the embodiment of FIGS. 1-4 is formed as a continuous guide edge 40, shown curved, which is engaged by the corresponding latch pin 35 in a released position. The support of the latch roller or pin 35 appears desirable in high speed operation of sorters and the like.

The latch release lever 36 projects laterally outwardly beneath the arm 34 and the outer end terminates in a wheel or roller 41 which is rotatably mounted on shaft 42 having an axis of rotation normal to the movement of the tray assembly.

Each of the discharge control assemblies 5 at several unloading stations 4 includes a cam 42 in the form of a platelike member adapted to be selectively positioned from a retracted position into an actuating position in the path of the rollers 41 of the several actuators. A solenoid 43 is coupled to position the cam 42 as a result of the output of unit 6 in any suitable manner. With the cam 42 raised, the wheel or roller 41 engages the inclined surface. This forces the lever 36 to rise upwardly thereby positively pivoting the latch pin 35 from the latch notch 39 of the related arm 34 and releasing the assembly for the pivot movement to the discharge position as previously described. The discharge assembly 5 can of course be of any suitable construction and no further description thereof is presently given. It preferably is constructed in accordance with the teaching of Applicants' co-pending application, entitled "CONVEYING SUPPORT TRIPPING LATCH CONSTRUCTION" which was filed on the same date as the present application and is assigned to the same assignee.

In accordance with a further aspect of the present invention, the split tray assembly 1 may include a tray cover 44 which extends completely across the two separate tray members 9 and 10 and particularly covers and closes the space therebetween. The tray cover 44 is shown formed of a relatively heavy plastic with a central depression connection in the underside to define the portion 45 which is reduced in thickness. The portion 45 facilitates the convenient and ready flexing of the tray cover between the two tray members 9 and 10 as a member pivots between the transport and discharge position. The pivot point is shown moved upwardly within the V or apex of the projection of the supporting tray members 9 and 10 with the flexible portion 45 lying immediately above the pivot axis when in the upper or transport position. Such a construction permits reliable tilting of the one member with a continuous radius in the interconnection portion in the transport position and a flat surface in the expanded or discharge position as shown in FIG. 4.

The tray member 9, or 10, rapidly moves to the discharge position and has a tendency to recoil or bounce as a result of such rapid movement.

In accordance with a further feature of the present teaching, the individual tray members are provided with improved shock absorbing means to minimize such movement in the form of suction cup bumper means. In the illustrated embodiment, one or more suction cups 46 and 47 are secured to the one side of the top support bar 22 by similar brackets 48. The cups open upwardly toward the corresponding tray member 9 and are angularly oriented such that the edge 49 of the cup lies essentially in the plane of the released tray member 9 in the unload position. As the tray member 9 drops, the underside engages and deflects the edge of the cup member, thereby tending to compress the volume and creating the well-known gripping effect of a suction cup. As most clearly shown in FIG. 4, the tray member 9 and cover 44 is provided with one or more small openings 50 in the portion overlying the suction cup 46. The small openings are selected so as to not interfere with a gripping of a tipped tray member. However, the openings initiate a timed release of their grip on the tray by admitting a metered flow of atmospheric air into the low-pressure confines of the deflected cup to permit the ready release and resetting of the tilted or released tray member to the horizontal transporting position.

The tray structure can be reset to the transport position through any suitable means such as a resetting device provided immediately forwardly of the loading station 3. The device may be an inclined ramp which engages a released tray structure and causes it to positively move upwardly until the lever 34 is positioned in latching engagement with the latch pin 35.

The conveying apparatus of the present invention with the tray sections mounted to define an interrelated pivot support for a load in combination with the individual pivots permitting release of the individual tray sections at discharge position has been found to provide a reliable and rugged tilting discharge type conveying apparatus which can be readily applied to the various practical applications encountered in industry today. The conveying apparatus and the support structures can be readily adapted to many transport applications and particularly sorting of items fed to a common induction station such as in retail warehousing, for example. Extra long packages can be readily accommodated by a pair of tray units of the present invention for maintaining reliable movement and discharge of such loads at preselected unloading stations.

The operation of the illustrated embodiment of the invention may thus be briefly summarized as follows. The carriage structures 11 with the attached tray units 1 are supported in a predetermined path, for example, the closed loop such as shown in FIG. 1 for movement between a loading station 3 and the plurality of unloading stations 4. The loads 7 are placed on the tray units, automatically or manually. The keyboard 6 is then actuated to control the selection of the actuating mechanisms 5 in relationship to the receiving means 8. The carriages 11 are continuously driven through the chain drive 2 to move past the receiving means. As a tray unit 1 approaches an unloading or receiving means 8, a corresponding actuating means 5 is operated to release the proper latch means 26 or 27, depending upon the required direction of discharge, and thereby drop the appropriate side of the tray assembly to discharge the load 7. The double inclined surfaces 12 and 13 and the angular orientation of the tray unit in the direction of movement results in the load moving longitudinally forwardly and laterally into the receiving means 8. Thus, the actuating means 5 are located slightly prior to the receiving means 8 such as to accommodate the trajectory of this dual or angular movement.

Applicants have found that this provides for a highly improved reliable transfer of a load from a tray structure into a selected receiving means. After dropping of the load, the tray structures will move with the tray side dropped downwardly and with the tripping roller 41 held upwardly as a result of engagement of the inner edge of the lever or arm 34 and the pivot roller 35 as shown in FIG. 4. As the tray unit approaches a relatch station, not shown, the tilted tray is reset by a suitable member which positively engages the underside of the tray structure and moves it upwardly aligning the locking notch 39 with the roller 35 and thereby allowing the mechanism to reset to the transport position shown in FIG. 2 for receiving a following load.

Figure 6:
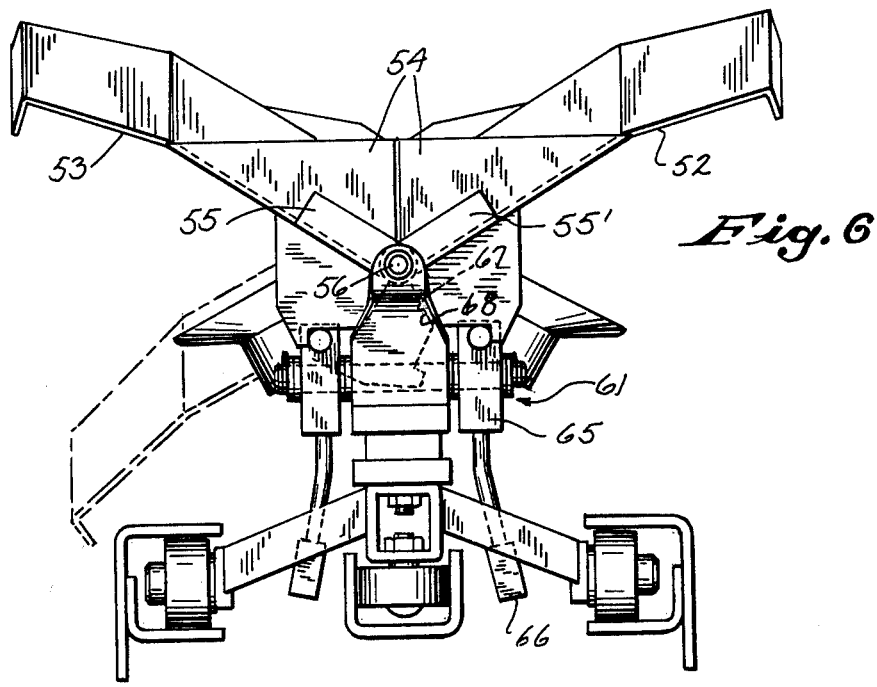
FIG. 6 is a front elevational view of an alternative construction.
Figure 7:
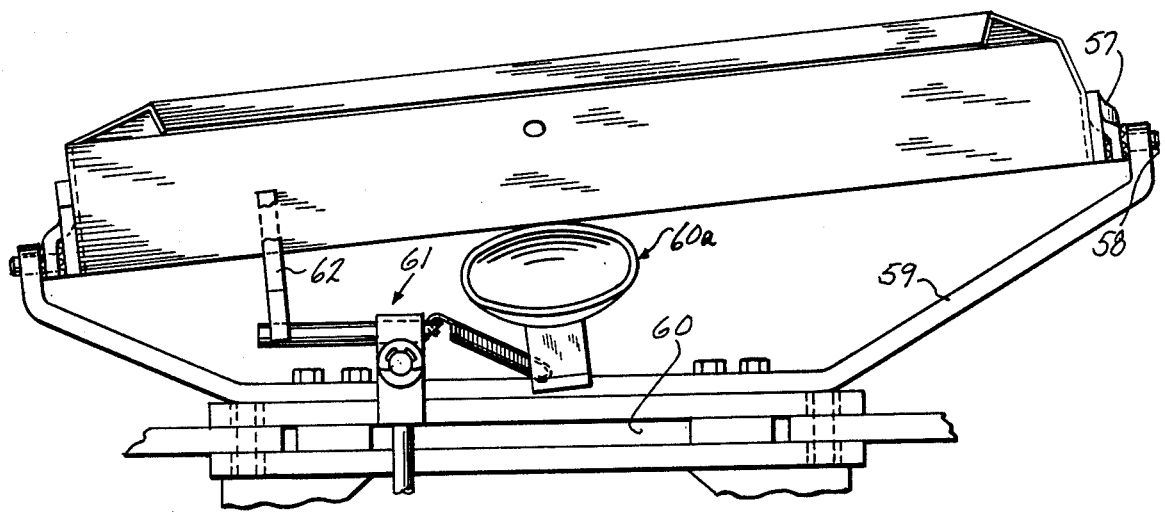
FIG. 7 is a side elevational view of FIG. 6.

An alternative embodiment of a split tray unit constructed in accordance with the teachings of the present invention in shown in FIGS. 6 and 7. Although this unit may be generally applied it is particularly adapted for installation wherein the loads and/or packages which do not have special problems such as small or short loads and loads which do have strings, tags or the like. Generally, the invention as shown in FIGS. 6 and 7 includes a pair of tray members 52 and 53, each of which is preferably formed with the double inclined supporting surface. In the embodiment of FIGS. 6 and 7 the tray members 52 and 53 each include an integral front wall 54 which extends upwardly co-extensively with the first planar load supporting portion of the tray members. The front leading ends of the tray members are each pivotally supported by a bracket 55 secured to the corresponding front wall and journaled on a common pivot pin 56. The trailing end of the tray members is provided with brackets 57 and similarly journaled on a pivot pin 58.

The pivot pins 56 and 58 are secured to a generally inverted U-shaped carriage member 59 which is also formed to locate the pivot axis of the pins to angularly orient the tray members 52 and 53 with respect to the vertical plane through the center of the tray members. The U-shaped bracket 59 is secured to a chain drive unit 60 of any suitable construction.

In the embodiments of FIGS. 6 and 7 the tray members are provided with a similar latch means 61 and that for the tray member 52 is described in detail. Thus, the latch means includes a plate 62 which is edge mounted and rigidly affixed to the tray member. The plate 62 extends downwardly therefrom with the lower end located somewhat below the pivot axis of the tray but above the chain drive assembly 60. The lower inner edge of the plate 62 is provided with a notch or cut-out corner 63 defining a latching notch of a pin and notch latch means. A pin or rod member 64 is pivotally attached to the U-shaped carriage 59 and projects longitudinally thereof for selective mating with the notch 63 to positively hold the tray member 52 in the transport position. The rod 64 is secured to a pivot bushing 65 which is pivotally attached to the U-shaped member 59 with the pivot axis normal to the direction of tray transport movement. A tripping lever or arm 66 depends downwardly from the pivot bushing with the lower end located to be selectively engaged by a raised cam member, such as in the previous embodiment. Engagement with the cam member pivots the lever arrangement to release the notched plate 62 and thereby permit the tray member 52 to drop downwardly to a discharge position similar to the previous embodiment.

A bumper means 60a limits the discharge position of the tray member 52 and is preferably a suction bumper unit such as disclosed in the previous embodiment.

In the embodiment of the invention as illustrated in FIGS. 6 and 7, the latch plates 62 are secured to the tray members 52 and 53 in longitudinal alignment with opposed inner edges 67 and 68. Further, they are constructed such that when a tray member, such as member 52, is released and drops to the discharge position, the inner depending edge 67, which is opposed to the corresponding edge 68 of the opposite latch plate, which will move into slight engagement with the opposed edge 68. This will result in a slight vibration or jogging of the opposed tray member 53 to assist in the discharge of a load on the tray assembly such as by overcoming static friction and the like. The notch in the latch plate is shaped so that the nudge, jog or bump does not allow the opposed tray member to drop.

This desired interaction may be obtained in any other suitable manner. For example, in the previous embodiment the offset latch means may be provided with interferring appurtenance means, or the tray members may be similarly formed with suitable interferring elements.

The embodiment of the invention illustrated in FIGS. 6 and 7 thus operates functionally and basically in the same manner as the previous embodiment and shows possible alternative features in accordance with the basic teaching of the present invention.

Figures 8, 9:
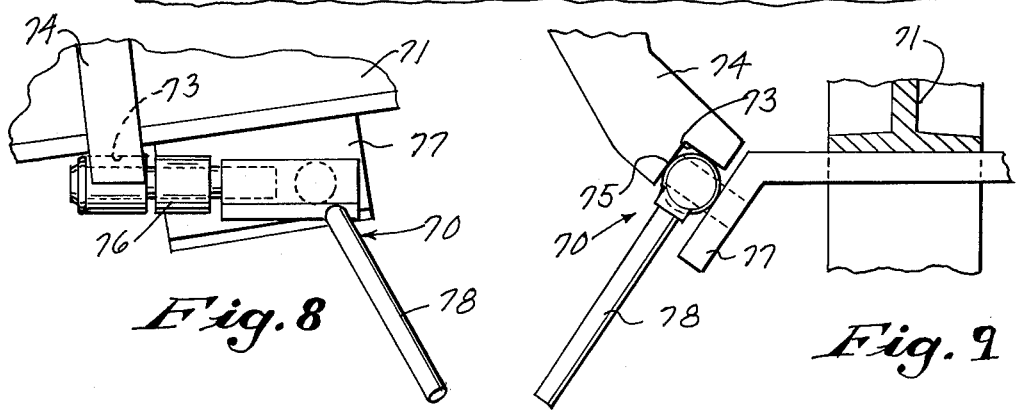
FIG. 8 is a side elevational view of an alternative tray latch means.
FIG. 9 is a side elevational view of an alternative tray latch means.
Figure 5:
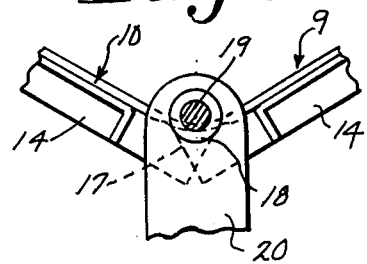
FIG. 5 is an enlarged fragmentary view more clearly showing a mounting a tipping axis of the tray unit shown in FIGS. 1-4.

In FIGS. 8 and 9, an alternative latch means is illustrated employing an L-shaped lever 70 pivotally attached to a top carriage bar 71, such as the carriage bar 21 in FIGS. 2 and 3. The latch leg 72 of lever 70 projects generally horizontal in the transport or reset position with the outer end in the notch 73 of latch member 74 of the tray, not shown. The outermost ends include a roller 75 for reducing the required removal force. The latch lever 70 is angularly oriented with respect to the vertical plane such that the roller 75 moves downwardly and laterally as the lever pivots to a release position.

In addition, a second intermediate roller 76 is also journaled on the latch leg 72 and engages a support bracket 77, welded or otherwise secured to the carriage bar 71. The tray and load forces are thus transmitted to and from the latch leg 72 to the bracket 77 and removed from the pivot support of the L-shaped lever 70.

In operation, a release or trip member, not shown, is disposed in the path of the depending leg 78 of the lever 70, causing it to pivot counterclockwise, as viewed in FIG. 9, to release the tray latch member 74 and corresponding tray member. The intermediate roller 76 rolls along the bracket 77 to maintain the load transfer to the carriage 21 and off the pivot mechanism.

The present invention thus provides an improved support means for conveying of loads between predetermined points or areas and in particular is adapted to high speed sorting and other conveying devices such as required by present warehousing, distributing and sorting systems.

Various modes of carrying out the invention are contemplated as being within the scope of the following claims particularly pointing out and distinctly claiming the subject matter which is regarded as the invention.

We claim:

1. An apparatus for transporting articles along a substantially horizontal path and for dispensing articles at an unloading station along said path comprising a first tray member, a second tray member, a carriage means mounted on wheels and having a front end, a pivot support means secured to said carriage means and to said tray members, said pivot support means defining a tilt axis for at least one of said tray members, said tilt axis extending lengthwise of the tray members, means for holding the tray members in a transport position, each of said tray members including a laterally extending support surface disposed above said tilt axis in the transport position thereof, each support surface including first and second interconnected portions each of which extend outwardly and upwardly with a different predetermined angular orientation with respect to said tilt axis to define a generally V-shaped load support assembly when said tray members are in the transport position, said tilt axis being substantially angularly oriented relative to said path and being substantially angularly orientated in a vertical plane between the tray members and locating the front end of the tray members below the rear end thereof, a front wall means spanning the front end of the tray members and projecting thereabove to hold an article thereon, means for gravity biasing an article on said tray members toward said front wall means, said biasing means including said tilt axis being tilted with respect to a plane containing the axis of said wheels and with respect to said path in an amount sufficient to gravity bias an article on said support assembly toward said front wall means and in the direction of transporting whereby the biasing of an article aids in the dispensing of said article by positioning the article against the front wall means.

2. The support structure of claim 1, wherein said pivot support means is constructed to position the tilt axis offset from the adjacent edges of the tray members, and means to locate the released tray with the adjacent edges aligned in the tilt position.

3. The support structure of claim 1, wherein said pivot support includes a pair of pivot locating members for each of said tray members projecting upwardly between said first and second tray members with the members in the transport position.

4. The support structure of claim 1, wherein each of said tray members includes a pivot locating member having a support brace secured to the underside of the tray members at the opposite ends of the tray members, said braces on said tray members being oppositely offset longitudinally at the opposite ends of the tray members whereby said tray members are interchangeable on said pivot support means.

5. The support structure of claim 1, wherein said forward wall means is separate from said tray members and is fixedly mounted relative thereto.

6. The support structure of claim 5, wherein said forward wall includes a lower resilient means engaged by the aligned tray member in the transport position, said resilient means creating a load on the tray member.

7. The support structure of claim 1, wherein said forward wall includes a pair of members secured one each to each tray member.

8. The support structure of claim 1 wherein said forward wall means is separate from said tray members and overlies the forward end, means to fixedly mount the wall means relative to the tray members, said wall means being formed of plastic and having a lower flexible edge extending over the tray member, said edge being deflected by the tray member in the transport position.

9. The support structure of claim 1, wherein said forward wall means includes a lower resilient lip means engaged by the aligned tray member in the transport position, said resilient means creating a load on the tray member in the transport position.

10. The support structure of claim 1, including a continuous cover member secured to said tray members and spanning the spacement therebetween to provide a continuous supporting surface, the cover member between said tray members being pivotal to permit the free tilting movement of the tray members.

11. The support structure of claim 1 including a continuous plastic cover member secured to said tray members and spanning the spacement therebetween to provide a continuous supporting surface, the plastic cover member aligned with said spacement being highly flexible to allow unimpeded movement of the tray members.

12. The support structure of claim 10, wherein said pivot support means is constructed to position the tilt axis above the adjacent edge of the first position of the tray member, and said continuous cover member includes a central portion of highly flexible plastic to permit said pivotal movement of the tray member.

13. A conveying apparatus in accordance with claim 1 wherein the angular orientation of the second portion of the support surface with respect to said plane is less than the angular orientation between said first portion and said plane, each of said first and second portions being disposed at an acute angle with respect to said plane.

14. A conveying apparatus comprising, a support carriage, a tray member pivotally mounted on said carriage, a releasable latch means for supporting the tray member in a transport position, said latch means including a latch member on said tray member, a latch lever pivotally attached to the carriage and having a latch leg releasably coupled to the latch member by a pin and notch connection means, a bearing means secured to the latch leg in spaced relation to the pin and notch connection means, and a support bracket secured to the carriage with said bearing means thereon to transfer the load on the lever to the bracket.

15. A conveyor system, comprising a series of support carriages each including a support frame having a top pivot bar and a bottom drive bar, an endless articulated drive means connected to said bottom drive bar of said carriages to continuously move the carriages between a loading station and a plurality of unloading stations, said top pivot bar being angularly oriented in a vertical plane with the leading end located below the trailing end, a load tray assembly secured to each of said carriages, each tray assembly including a pair of corresponding tray members having a first planar portion with a transport position in which said first planar portions define a generally V-shaped receptacle extending parallel to the top pivot bar, a stop wall means located immediately at the leading edge of the tray members to form a load support means, pivot means secured to said tray members and to said top pivot bar to individually and separately pivotally support each of said tray members, said pivot means supporting said tray members with the adjacent edges laterally spaced from each and with a pivot axis spaced above the intersection of the projection of said first planar portions, latch means for each tray member for support in the transport position and including a latch lever movably secured to the carriage and a latch member secured to the tray member, said latch lever and member including a pin and notch type connection with disengagement established by selected movement of the lever, means adapted to be selectively positioned in the path of the latch lever and operable to move the latch lever to establish said disengagement and provide for gravity movement of the corresponding tray member, and a cover member secured to each pair of tray members and covering said first and second tray portions and the space between said tray members, the cover aligned with said space between said tray members being flexible to establish unrestricted pivotal movement of the tray members in response to release of said latch means, and to form a smooth and uninterrupted coplanar surface with the two tray members when either one is in the dropped position.

16. The conveyor system of claim 15, wherein each of said tray members includes a second planar portion projecting angularly laterally outwardly from said first planar portion.

17. The conveyor system of claim 15, including a pair of suction cup bumpers for each of said tray members, mounting means secured to the carriages in longitudinal spaced relation with the suction cup bumpers opening upwardly and with a planar cup-edge located in the plane of the tray member in the pivoted position with the tray member engaging the cup member and being releasably attached thereto by a suction force, said bumper cup and tray member defining a suction chamber and including a metering opening to release the suction force and permit ready separation of the tray member for resetting thereof.

18. A support structure for conveying apparatus comprising a first tray member, a second tray member, a pivot support means secured to said members and defining a tilt axis for at least one of said tray members extended lengthwise of the tray members, means for holding the members in a transport position, each of said members including a laterally extending support surface including a first portion extending outwardly and upwardly with a predetermined angular orientation with respect to said tilt axis to define a generally V-shaped load support assembly with said tray members in the transport position, and said tilt axis being angularly orientated in a vertical plane between the tray members and locating the leading end of the tray members below the trailing end, and a forward wall means spanning the forward end of the tray members to hold a load thereon, said means for holding the members in a transport position including separate latch means on each member, each of said latch means including a laterally extending latch member secured to the corresponding tray member and a latch lever secured to the pivot support means, said latch member and lever being coupled by a notch and pin type connection means to releasably hold the tray to release the latch member and corresponding tray member, each of said tray members having a means engaged with an opposite tray member as a result of the release of a tray member to mechanically jog the non-released tray member.

19. The support structure of claim 18, wherein said latch lever is generally an L-shaped unit having a pivotally mounted support with a rod element mating with the notch and a depending actuating element, a fixed support bracket and a bearing means secured to the rod element and bearing on the bracket to transfer the load on the lever to the bracket.

20. A support structure for conveying apparatus comprising a first tray member, a second tray member, a pivot support means secured to said members and defining a tilt axis for at least one of said tray members extended lengthwise of the tray members, means for holding the members in a transport position, each of said members including a laterally extending support surface including a first portion extending outwardly and upwardly with a predetermined angular orientation with respect to said tilt axis to define a generally V-shpaed load support assembly with said tray members in the transport position, and said tilt axis being angularly orientated in a vertical plane between the tray members and locating the leading end of the tray members below the trailing end, and a forward wall means spanning the forward end of the tray members to hold a load thereon, a separate latch means for each tray member defining the means for the transport position and each latch means including a latch lever movably secured to the carriage and a latch member secured to the tray member, said latch lever and member including a resiliently loaded pin and notch type connection with disengagement established by selected movement of the lever, said latch member having a curved surface engaged by the latch lever to move the latch lever upon establishing said disengagement and the corresponding movement of the tray member.

21. The support structure of claim 20, wherein each latch lever is pivotally secured to the carriage and includes a roller, and each latch member includes a notch engaged by said roller in the transport position, said roller and latch lever having parallel axes, said lever having a portion spaced from said roller adapted to be selectively positioned in the path of the latch lever and operable to move the latch lever to establish said disengagement and provide for gravity movement of the corresponding tray member.

22. A conveyor system having a series of support carriages including an integral rectangular frame having a top pivot bar and a bottom drive bar, an endless articulated drive means connected to said bottom drive bar of said carriages to continuously move the carriages between a loading station and a plurality of unloading stations, said top pivot bar being angularly oriented in a vertical plane with the leading end located below the trailing end, a pivot plate secured to each of the opposite ends of the top bar and each having a pivot pin secured in the top end and projecting toward the opposite pin, a load tray assembly secured to each of said carriages, each tray assembly including a pair of corresponding tray members having a first planar portion and a second planar portion projecting angularly outwardly from said first planar portion with a transport position in which said first planar portions define a generally V-shaped receptacle extending parallel to the top pivot bar, a pair of pivot braces secured one at each end to the underside of said tray members and having a vertical arm projecting upwardly between said tray members, each arm having an opening journalled on said pin to individually and separately pivotally support each of said tray members, said pivot means supporting said tray members with the adjacent edges laterally spaced from each and with a pivot axis spaced above the intersection of the projection of said first planar portions, a stop wall means attached to the front pivot plate located immediately at the leading edge of the tray members to form a load support means, said wall means having a deflectable lower edge lip overlying the forward ends of the tray members and deflected by the tray members in the transport position to resiliently load the tray members, latch means for each tray member for support in the transport position and including a latch lever movably secured to the carriage and a latch member secured to the tray member, said latch lever and member including a pin and notch type connection with disengagement established by selected movement of the lever, means adapted to be selectively positioned in the path of the latch lever and operable to move the latch lever to establish said disengagement and provide for gravity movement of the corresponding tray member, and a cover member secured to each pair of tray members and covering said first and second tray portions and the space between said tray members, the cover aligned with said space between said tray members being flexible to establish unrestricted pivotal movement of the tray members in response to release of said latch means, the cover aligned with said pivot arms being offset to overly the upper ends of the arms, a pair of suction cup bumpers for each of said tray members, mounting means secured to the carriages in longitudinal spaced relation with the suction cup bumpers opening upwardly and with a planar cup-edge located in the plane of the tray member in the pivoted position with the tray member engaging the cup member and being releasably attached thereto by a suction force, said bumper cup and tray member defining a suction chamber and including a metering opening to release the suction force and permit ready separation of the tray member for resetting thereof.

23. A support structure for conveying apparatus comprising a first tray member, a second tray member, a pivot support means secured to said members and defining a tilt axis for at least one of said tray members extended lengthwise of the tray members, means for holding the members in a transport position, each of said members including a laterally extending support surface including a first portion extending outwardly and upwardly with a predetermined angular orientation with respect to said tilt axis to define a generally V-shaped load support assembly with said tray members in the transport position, and said tilt axis being angularly orientated in a vertical plane between the tray members and locating the leading end of the tray members below the trailing end, and a forward wall means spanning the forward end of the tray members to hold a load thereon, stop means to position the tilted member with said tray members defining an essentially coplanar discharge surface, said stop means including a suction cup bumper means having a metering opening to establish a controlled release of the tilted tray member.

24. A support structure for conveying apparatus comprising a first tray member, a second tray member, a pivot support means secured to said members and defining a tilt axis for at least one of said tray members extended lengthwise of the tray members, means for holding the members in a transport position, each of said members including a laterally extending support surface inclining a first portion extending outwardly and upwardly with a predetermined angular orientation with respect to said tilt axis to define a generally V-shaped load support assembly with said tray members in the transport position, and said tilt axis being angularly orientated in a vertical plane between the tray members and locating the leading end of the tray members below the trailing end, and a forward wall means spanning the forward end of the tray members to hold a load thereon, each tray member being pivotally supported by said pivot support means, each of said members including a laterally extending support surface including a first portion extending outwardly and upwardly with a predetermined angular orientation with respect to said tilt axis and a second portion extending outwardly and upwardly from said first portion with a significantly lesser angular orientation with respect to the horizontal, means to release said tray member to pivot downwardly, stop means to position the tilted member with said first portions of said tray members essentially coplanar with the opposite tray member, said stop means including a suction cup bumper means having a metering opening to establish a controlled release of the tilted tray member.

25. A support structure for conveying apparatus comprising a first tray member, a second tray member, a pivot support means secured to said members and defining a tilt axis for at least one of said tray members extended lengthwise of the tray members, means for holding the members in a transport position, each of said members including a laterally extending support surface including a first portion extending outwardly and upwardly with a predetermined angular orientation with respect to said tilt axis to define a generally V-shaped load support assembly with said tray members in the transport position, and said tilt axis being angularly orientated in a vertical plane between the tray members and locating the leading end of the tray members below the trailing end, and a forward wall means spanning the forward end of the tray members to hold a load thereon, a tray support carriage including a top pivot bar secured by a pair of posts to a bottom drive bar, said top pivot bar being angularly orientated in a vertical plane with the leading end located below the trailing end, a pair of horizontal pivot pins secured to the ends of said pivot bar, said members including pivot arms projecting upwardly between the tray members and journaled on said pins to locate the pivot axis spaced above the intersection of the projection of said tray members.

26. In a conveying apparatus having a tilting tray member for discharging a load, a suction cup bumper means for each of said tray members, mounting means secured to the carriages in longitudinal spaced relation with the suction cup bumpers opening upwardly and with a planar cup-edge located in the plane of the tray member in the pivoted position with the tray member engaging the cup member and being releasably attached thereto by a suction force, said bumper cup and tray member defining a suction chamber and including a metering opening to release the suction force and permit ready separation of the tray member for resetting thereof.

* * * * *